United States Patent
Gainey, Jr. et al.

(10) Patent No.: US 8,316,172 B2
(45) Date of Patent: **\*Nov. 20, 2012**

(54) INTERRUPTION FACILITY FOR ADJUNCT PROCESSOR QUEUES

(75) Inventors: Charles W. Gainey, Jr., Poughkeepsie, NY (US); Klaus Meissner, Herrenberg (DE); Damian L. Osisek, Vestal, NY (US); Klaus Werner, Moetzingen (DE)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/196,986

(22) Filed: Aug. 3, 2011

(65) Prior Publication Data

US 2011/0289249 A1    Nov. 24, 2011

Related U.S. Application Data

(63) Continuation of application No. 12/254,892, filed on Oct. 21, 2008, now Pat. No. 8,019,922.

(51) Int. Cl.
*G06F 13/24* (2006.01)
(52) U.S. Cl. ............... 710/260; 710/52; 710/5; 710/240
(58) Field of Classification Search .......... 710/260–269, 710/240–244, 200, 5, 52
See application file for complete search history.

(56) References Cited

U.S. PATENT DOCUMENTS

| | | | |
|---|---|---|---|
| 5,339,449 A | 8/1994 | Karger et al. | |
| 6,745,258 B1 * | 6/2004 | Pellegrino et al. | 710/33 |
| 6,810,457 B2 | 10/2004 | Hagiwara | |
| 7,117,338 B2 * | 10/2006 | Brewer | 711/207 |
| 7,177,963 B2 * | 2/2007 | Burns et al. | 710/52 |
| 7,181,548 B2 * | 2/2007 | Ellis et al. | 710/5 |
| 7,547,861 B2 * | 6/2009 | Jorgensen | 219/121.5 |
| 7,581,033 B2 * | 8/2009 | Ebersole et al. | 709/250 |
| 8,019,922 B2 | 9/2011 | Gainey, Jr. et al. | |
| 2005/0257224 A1 | 11/2005 | Whalen | |
| 2006/0200595 A1 * | 9/2006 | Maharana et al. | 710/30 |

OTHER PUBLICATIONS

"z/Architecture—Principles of Operation," IBM Publication No. SA22-7832-06, Seventh Edition, Feb. 2008.
Office Action for U.S. Appl. No. 12/254,892 dated May 10, 2010.
Office Action for U.S. Appl. No. 12/254,892 dated Oct. 28, 2010.

* cited by examiner

*Primary Examiner* — Tim T Vo
*Assistant Examiner* — Kim Huynh
(74) *Attorney, Agent, or Firm* — John E. Campbell; Blanche E. Schiller, Esq.; Heslin Rothenberg Farley & Mesiti P.C.

(57) ABSTRACT

Interruption facility for adjunct processor queues. In response to a queue transitioning from a no replies pending state to a reply pending state, an interruption is initiated. This interruption signals to a processor that a reply to a request is waiting on the queue. In order for the queue to take advantage of the interruption capability, it is enabled for interruptions.

13 Claims, 4 Drawing Sheets

INTERRUPTION FACILITY FOR ADJUNCT PROCESSOR QUEUES

This application is a continuation of co-pending U.S. Ser. No. 12/254,892 entitled "INTERRUPTION FACILITY FOR ADJUNCT PROCESSOR QUEUES, filed Oct. 21, 2008, which is hereby incorporated herein by reference in its entirety.

BACKGROUND

This invention relates, in general, to facilitating processing within a processing environment, and in particular, to facilitating processing of queues of adjunct processors of the processing environment by enabling interruptions for the queues.

Adjunct processors are processors that are subordinate or alternate to the central processors of a processing environment. The interface to an adjunct processor is asynchronous, and queues are employed by the adjunct processor to communicate with the central processors. Requests are placed in a queue by one or more programs executing on one or more central processors, a tap is issued to indicate new work, the adjunct processor processes the requests and places replies in the queue, and the queue is monitored closely for the replies.

Today, difficulties exist in determining when requests have completed and replies are available. Currently, the mechanism used to determine the availability of a reply is to blindly issue a dequeue instruction by a program executing on a central processor. This instruction is issued without knowing whether or not a reply is indeed available to be retrieved from the specified queue. This is known as polling, and is typically initiated from an interval timer mechanism. Polling, however, can negatively affect throughput and some polling can be considered non-productive.

BRIEF SUMMARY

Based on the foregoing, a need exists for an enhanced mechanism to signal completion of one or more prior requests of a queue. In particular, a need exists for an interruption capability that enables completion of requests to be signaled.

The shortcomings of the prior art are overcome and additional advantages are provided through the provision of a computer program product for facilitating processing of queues of a processing environment. The computer program product includes a storage medium readable by a processing circuit and storing instructions for execution by the processing circuit for performing a method. The method includes, for instance, determining that a queue of the processing environment has transitioned from a no replies pending state to a reply pending state, wherein the queue is indirectly accessible to user programs; and initiating an interrupt for the queue, in response to determining that the queue has transitioned from the no replies pending state to the reply pending state.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, an interruption capability is provided in which an interruption is initiated, in response to a queue transitioning from a state where no replies are pending to a state where one or more replies are pending. In one example, the queue is an adjunct processor queue, and the transition occurs when a completed request (i.e., reply) is placed on a queue that has no replies.

Figure 1A:
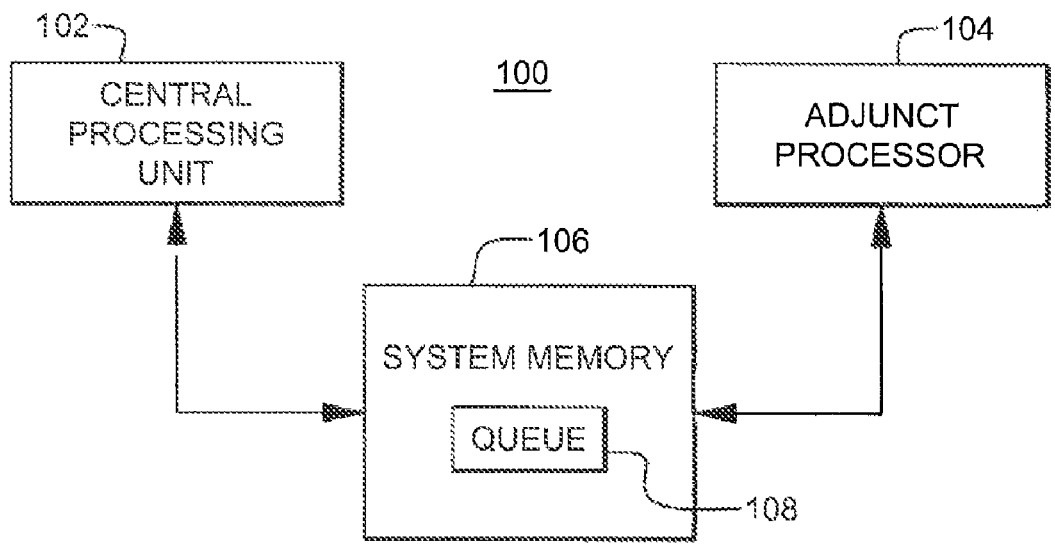
FIG. 1a depicts one example of a processing environment to incorporate and use one or more aspects of the present invention.

One embodiment of a processing environment to incorporate and use one or more aspects of the present invention is described with reference to FIG. 1a. In one example, a processing environment 100 includes at least one central processing unit 102 and at least one adjunct processor 104. The central processing unit is the central processor of the environment, while the adjunct processor is a subordinate or alternate processor that performs work for one or more of the central processing units. Each central processing unit may be coupled to main memory and to one or more I/O devices (not shown).

The at least one central processing unit and the at least one adjunct processor are coupled to a system memory 106. As one example, this memory is, for instance, a hardware system area, which is indirectly accessible and not visible to programs executing on the central processing unit. (Indirectly accessible herein means that the hardware system area or queue is only accessible by specific limited instructions and not otherwise accessible (e.g., cannot load into it, programs are unaware of addresses, etc.)). Located within the system memory are one or more queues 108. These queues are not directly visible from user programs and are instead considered part of the machine (i.e., the machine that includes the central processing unit(s), system memory and adjunct processor(s)). The central processing unit(s) have access to the queues in system memory by, for instance, issuing instructions to place requests on the queue, and/or to remove replies from the queue. The adjunct processor, however, does have direct access to the queues, and is responsible for taking requests off the queue, processing the requests, and placing replies to the requests on the queue.

In one example, the machine is based on the z/Architecture® offered by International Business Machines Corporation. For instance, the machine is a system z10® enterprise class mainframe offered by International Business Machines Corporation. One embodiment of the z/Architecture® is described in "z/Architecture—Principles of Operation," SA22-7832-06, Seventh Edition, February 2008, which is hereby incorporated herein by reference in its entirety. z/Architecture® and z10® are registered trademarks of International Business Machines Corporation, Armonk, N.Y. Other names used herein may be registered trademarks, trademarks or product names of International Business Machines Corporation or other companies.

Figure 1B:
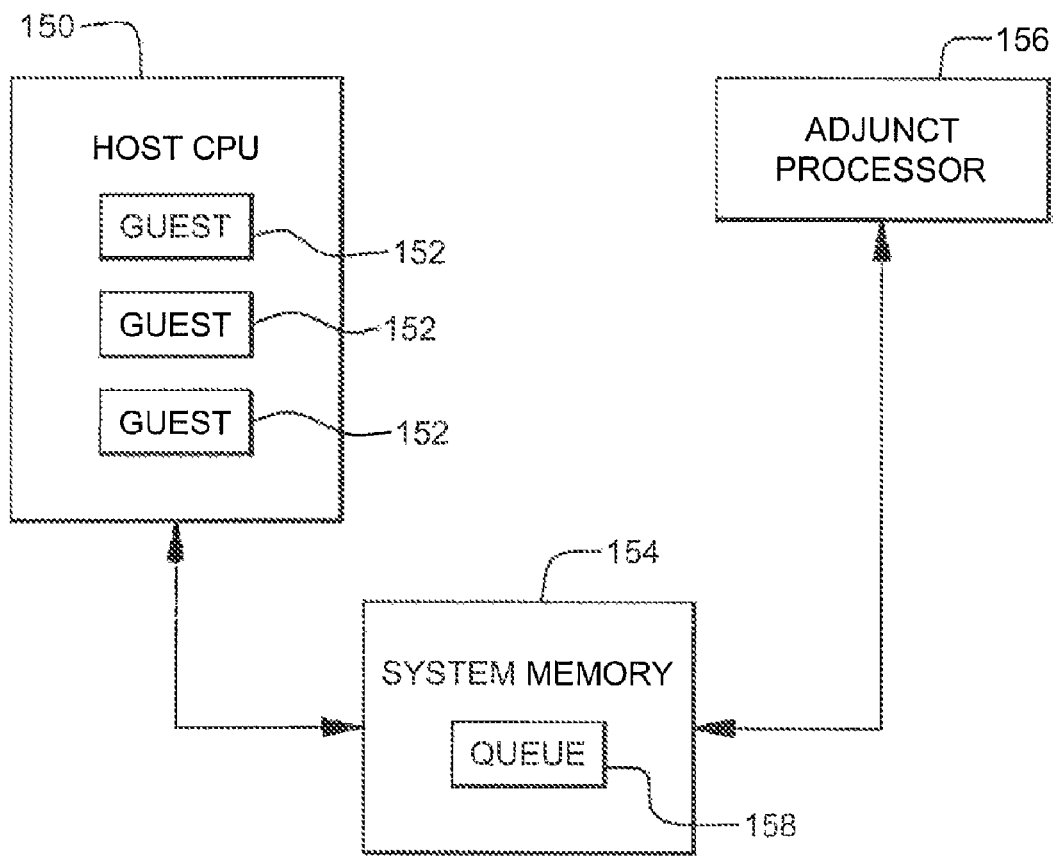
FIG. 1b depicts another example of a processing environment to incorporate and use one or more aspects of the present invention.

Another embodiment of a processing environment to incorporate and use one or more aspects of the present invention is described with reference to FIG. 1b. In this embodiment, the machine includes virtual support, and there is at least one host central processing unit 150 that includes a plurality of guest central processing units 152. The host central processing unit is coupled to a system memory 154. Additionally, there is at least one adjunct processor 156, which is also coupled to system memory 154. The system memory includes one or more queues 158. Again, in this example, the system memory, and thus, the queues are not visible to user programs.

In various embodiments, the host can dedicate the entire queue to one guest or multiplex the queue among a plurality of guests. If the queue is to be dedicated, then the host CPU (e.g., z/VM® offered by International Business Machines Corporation) can set up the guest CPUs to directly issue requests (e.g., instructions) interpretatively so that there is no host program involvement. (z/VM® is a registered trademark of International Business Machines Corporation.) However, if the queue is to be shared, then there is a multiplex/demultiplex situation and those requests are intercepted by the host program. The host program reissues those requests on behalf of the guest. Part of the payload of the request is then tagged or has an identifier included therewith, such that when completion of the request is returned, there is a way of knowing which guest is associated with the request. The host program can emulate the response back up to the guest in a way that makes the guest believe it has a dedicated queue, even though the queue is shared.

Although various embodiments of processing environments are described herein, many other environments may incorporate and use one or more aspects of the present invention. For example, other environments may include one or more machines that are logically partitioned and each logical partition is coupled to system memory. Other environments may also benefit from one or more aspects of the present invention.

In accordance with an aspect of the present invention, processing of the queues in system memory, such as queue 108 and/or queue 158, is facilitated by providing an interrupt capability that signals completion of requests on the queue. One embodiment of the processing associated with this interruption capability is described with reference to FIG. 2.

Figure 2:
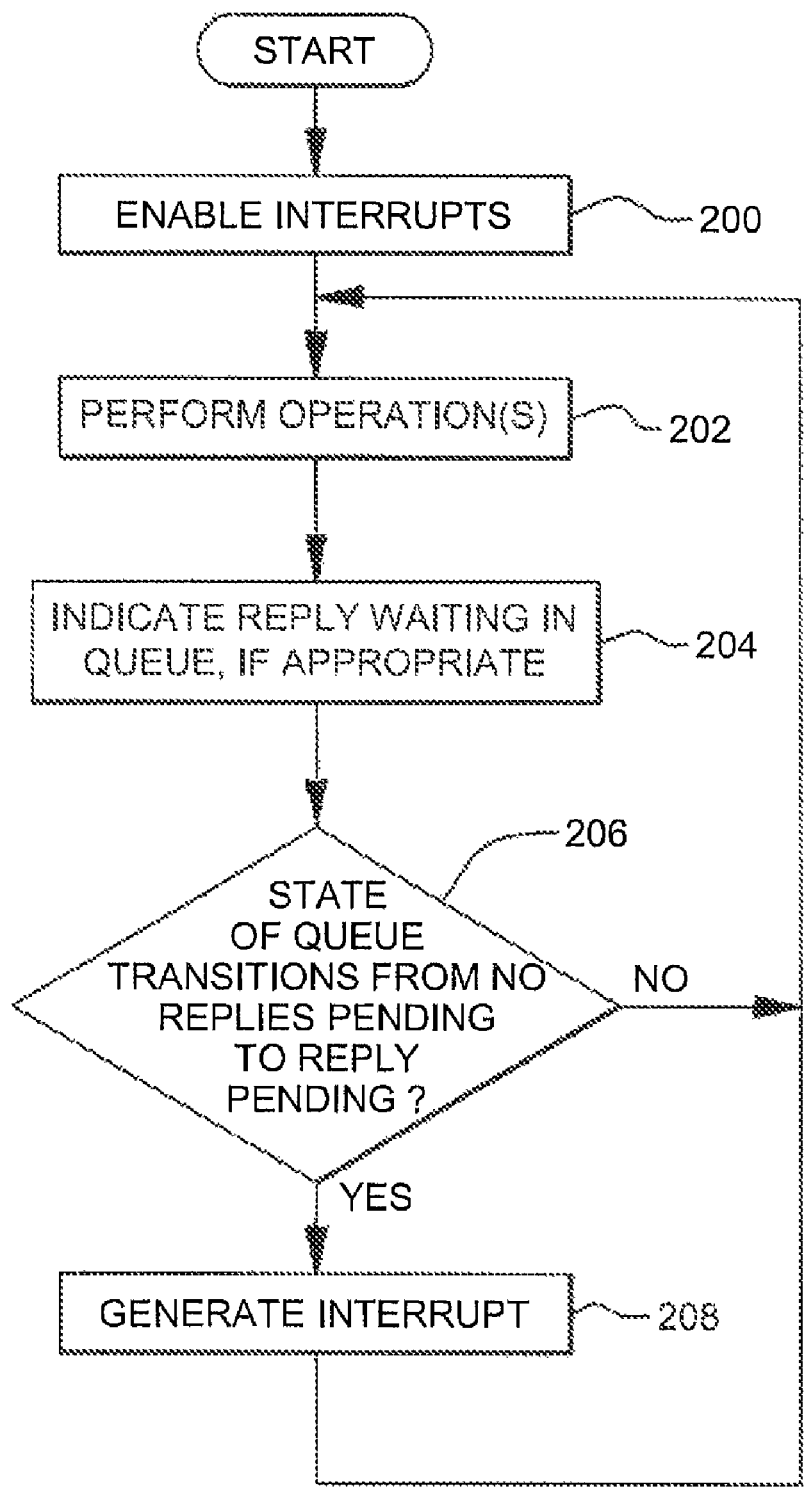
FIG. 2 depicts one embodiment of the logic associated with using interrupts to signal completion of requests on queues, in accordance with an aspect of the present invention.

Referring to FIG. 2, initially, before an interrupt can be generated for a queue, interrupts are enabled for the queue, STEP 200. In one example, an interrupt is enabled using an instruction (described below) issued by a central processor.

Thereafter, one or more operations, such as cryptographic operations, are performed, STEP 202. For example, one or more cryptographic requests are placed on a queue by one or more programs executing on one or more central processors. An adjunct processor retrieves the requests, processes the requests and places replies in the queue. If a reply is placed in the queue when the queue is in a no replies pending state, a reply waiting indicator is set transitioning the queue from the no replies pending state to a reply pending state, STEP 204. If the queue then receives other replies, the reply waiting indicator remains set and no transitioning occurs.

A determination is made as to whether the state of the queue has transitioned from no replies pending to a reply pending, INQUIRY 206. If the state of the queue has not transitioned, then processing continues with performing one or more operations, if any. However, if the state of the queue has transitioned from no replies pending to a reply pending, then an interrupt is generated by the adjunct processor to the central processor, STEP 208. This signals to the central processor that a dequeue instruction can be issued to extract information off of the queue. Each dequeue instruction extracts one reply from the queue. If after a dequeue, the reply waiting indicator is still on, then another dequeue instruction is issued. This may continue until the indicator is turned off indicating no further replies or for a predefined number of dequeue instructions, as examples.

In one example, the instruction to enable interrupts is issued by a central processing unit coupled to the system memory. By issuing this instruction, the queue is enabled for interrupts allowing the adjunct processor to generate an interrupt to the CPU for the queue. One embodiment of an instruction used to enable interrupts is described with reference to FIGS. 3A-3D. In one example, the instruction is referred to as a process adjunct processor queue (PQAP) instruction.

Figure 3A:
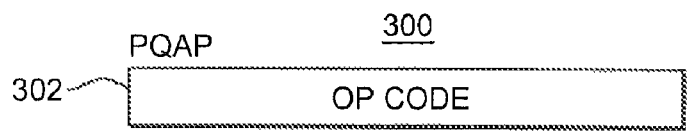
FIGS. 3a-3e depict components of an instruction used to enable interrupts of queues, in accordance with an aspect of the present invention.

One embodiment of the PQAP instruction is described with reference to FIG. 3A. In one example, a process adjunct processor queue instruction 300 includes an op code 302 designating the PQAP instruction. The PQAP instruction uses, in one example, various general registers for input and output, including, for instance, general registers 0, 1 and 2, as described below with reference to FIGS. 3B-3D. The instruction, when executed, sets/resets an enablement indicator of the queue and signals to the adjunct processor (via internal machine signaling) that the specified queue is enabled/disabled for interrupts.

Figure 3B:
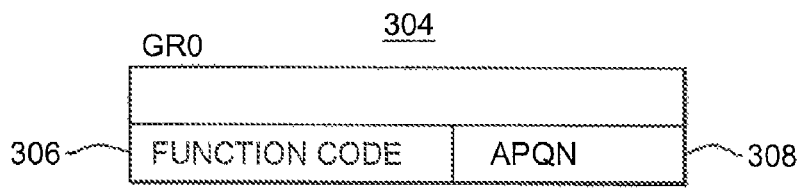

With reference to FIG. 3B, general register 0 (GR0) 304 is used as input for the instruction, and includes, for instance, a function code 306, which determines how the queue is to be processed, and an adjunct processor queue number field 308 that indicates the queue number of the adjunct processor to be processed. In this example, the function code designates an AP-queue interruption control (AQIC) that specifies enablement or disablement of an interrupt for the queue.

Figure 3C:
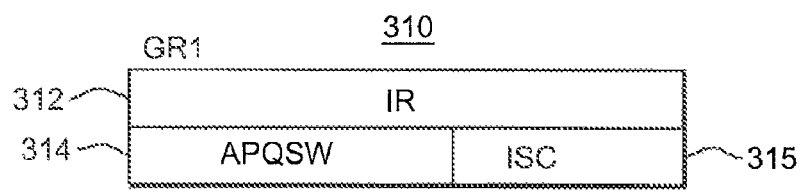

General register 1 (GR1) 310 of FIG. 3C is also used as input, and includes, for instance, an interruption request indicator (IR) 312 that indicates whether the request is to enable or disable the queue, and an interruption subclass (ISC) field 315 that specifies the interruption subclass, in one example. General register 1 is also used for output, and when used for output, includes, for instance, an AP-queue status word (APQSW) 314. Execution of an AP instruction causes the AP-queue status word to be returned. One format of the AP-queue status word is described with reference to FIG. 3E.

In one example, the information placed in E 316, R 318 and F 320 (e.g., bit positions 0-2) of the AP-queue-status word indicates the state of the content of the AP queue at the completion of the instruction. The APQSW includes, for instance:

Queue Empty (E) 316: When one, indicates that the queue is empty of all outstanding requests. When E is one, R and F are zero.

Replies Waiting (R) 318: When one, indicates that the queue includes one or more replies that are in the reply-pending state, and are thus, waiting to be dequeued from the queue. When R is one, E is zero.

Queue Full (F) 320: When one, indicates that the queue is full. When F is one, E is zero.

Interruption Enabled (I) 322: The I control (e.g., bit 7) indicates the enablement state of the interruption and notification. Hereafter, the interruption state also implies the notification state. When I is one, the queue is enabled. When I is zero, the queue is disabled. An interruption may be made pending only when the queue is enabled, in one embodiment. The reset state of the I bit is zero. The I bit is zero for a queue that is reset or zeroized.

When an AP queue is enabled for interruption, an interruption is made pending when the replies-waiting queue status changes from no replies in the reply-pending state to one or more replies in the reply-pending state. In other words, an interruption is made pending at the point where the R bit changes from zero to one. Once an interruption is made pending, whether or not it is also presented, a subsequent interruption is not made pending until there are no more replies in the reply-pending state and the queue remains enabled. In other words, a subsequent interruption is not made pending until the next time the R bit changes from zero to one.

When a queue interruption is pending, disabling the queue for interruption may or may not clear the interruption-pending condition.

When a queue is enabled for interruption, a reply notification byte is stored to a nonzero value when, for instance, (1) the queue has been assigned a notification indicator byte located at a non-zero address, (2) the queue has no entries in the reply-pending state (R is zero), and (3) a reply on the queue is placed into the reply-pending state (R becomes one). The notification indicator byte is zeroed during execution of the queue interruption control function when the IR bit is one.

Response Code 324: This field includes the response code of the instruction.

Figure 3D:
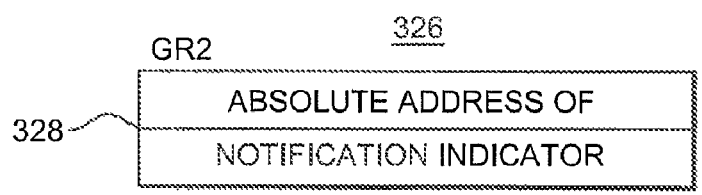
Figure 3E:
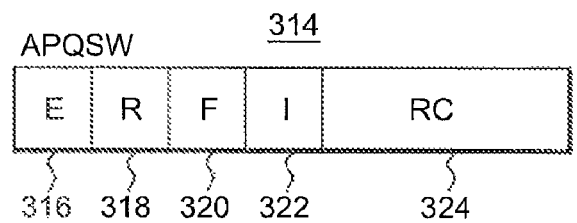

General register 2, an example of which is depicted in FIG. 3D at reference number 326, is also used as input to the instruction. It includes, in one example, a non-zero absolute address (e.g., relative to the beginning of the main storage relocation zone) of a notification indicator field 328 (e.g., a 64 bit address). This address is associated with a particular queue. When an interrupt is made pending for this particular queue, an indicator (e.g., any non-zero value) is placed at this address signifying that this queue has an interrupt pending. Therefore, when an interrupt is generated for a central processor, the central processor checks this field to determine if the interrupt was issued for this queue. If so, a dequeue instruction is issued for this queue. Otherwise, no dequeue instruction is issued for this queue. This same check is made for other queues managed by this central processor.

General register 2 is used, for instance, with successful completion of a test APQ function. It includes the AP type and the number of queue entries on each APQ in the configuration.

Further details regarding the AP queue interruption function control (AQIC) are further described below. In one embodiment, when IR (312, FIG. 3C) is 1:

Enablement of the queue for interruption is requested.
The interruption subclass is specified in an ISC field of general register 1.
This field specifies additional control of interruption enablement for this queue. (In other embodiments, this field need not be used.)
General register 2 includes a non-zero absolute address of the notification indicator byte. The byte is not subject to key control protection or low address protection, in one embodiment. If the content of general register 2 is zero or otherwise invalid, execution of PQAP completes with a specified condition code (e.g., condition code 03) and a specified response code (e.g., 06) in the AP-queue status word.
When the I bit of an AP-queue status word is one, the queue is enabled for presenting an interruption on the specified interruption subclass.
If the queue is already enabled for interruption or the asynchronous enablement or disablement process is not yet completed, execution of PQAP completes with a defined condition code (e.g., 03), and a specified response code (e.g., 07) in the AP-queue status word.

When IR is zero:
Disablement of the queue for interruption is requested.
The ISC field in general register 1 is ignored.
The content of general register 2 is ignored.
If the queue is already disabled for interruption or the asynchronous disablement or enablement process has not yet completed, execution of PQAP completes with a particular condition code (e.g., 03) and a specified response code (e.g., 07) in the AP queue status word.

As described herein, the above instruction is used to enable the specified queue for interruption, and once enabled, interrupts can be made pending for the queue. This eliminates the need for polling.

Described in detail above is one embodiment of a capability that provides interruptions for queues, and in particular, for queues of adjunct processors, in which those queues are stored in system memory indirectly accessible to user programs. Such queues may be used for different data payload including, for instance, cryptographic data or other data. In accordance with an aspect of the present invention, an interruption is made pending when a completed request causes the queue to change from no responses to be dequeued to one or more responses available to be dequeued. By using such an interrupt facility, the excesses associated with polling are eliminated.

One or more aspects of the invention can be used on many types of machines including, but not limited to, z10® machines and eClipz z6 machines, and with various operating systems, including, but not limited to, z/OS®, z/Linux and z/VM® operating systems. z/OS® is a registered trademark of International Business Machines Corporation. Although the above are provided as examples, many other types of machines and/or operating systems may be used without departing from the spirit of the present invention. Further, many types of processing environments can use one or more aspects of the present invention. As examples, an environment may include a plurality of CPUs and one adjunct processor (AP) servicing the plurality of CPUs; there can be a one to one correspondence of CPUs and APs; there may be a plurality of CPUs and a plurality of APs; or any combination thereof.

In architectures using z/VM®, as an example, the host program is the one that obtains the interruption, but the guest program is also using the capability. However, no interruption to the guest is performed. Rather, the host program uses the interruption through a productive dequeue instruction (e.g., DQAP), and then uses that information to inject an interruption to a guest upon the next dispatch. This gives the guest the impression that it has been interrupted, but having actually received the interruption in the host, it is also an initiative to increase the dispatch priority to the guest.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 4:
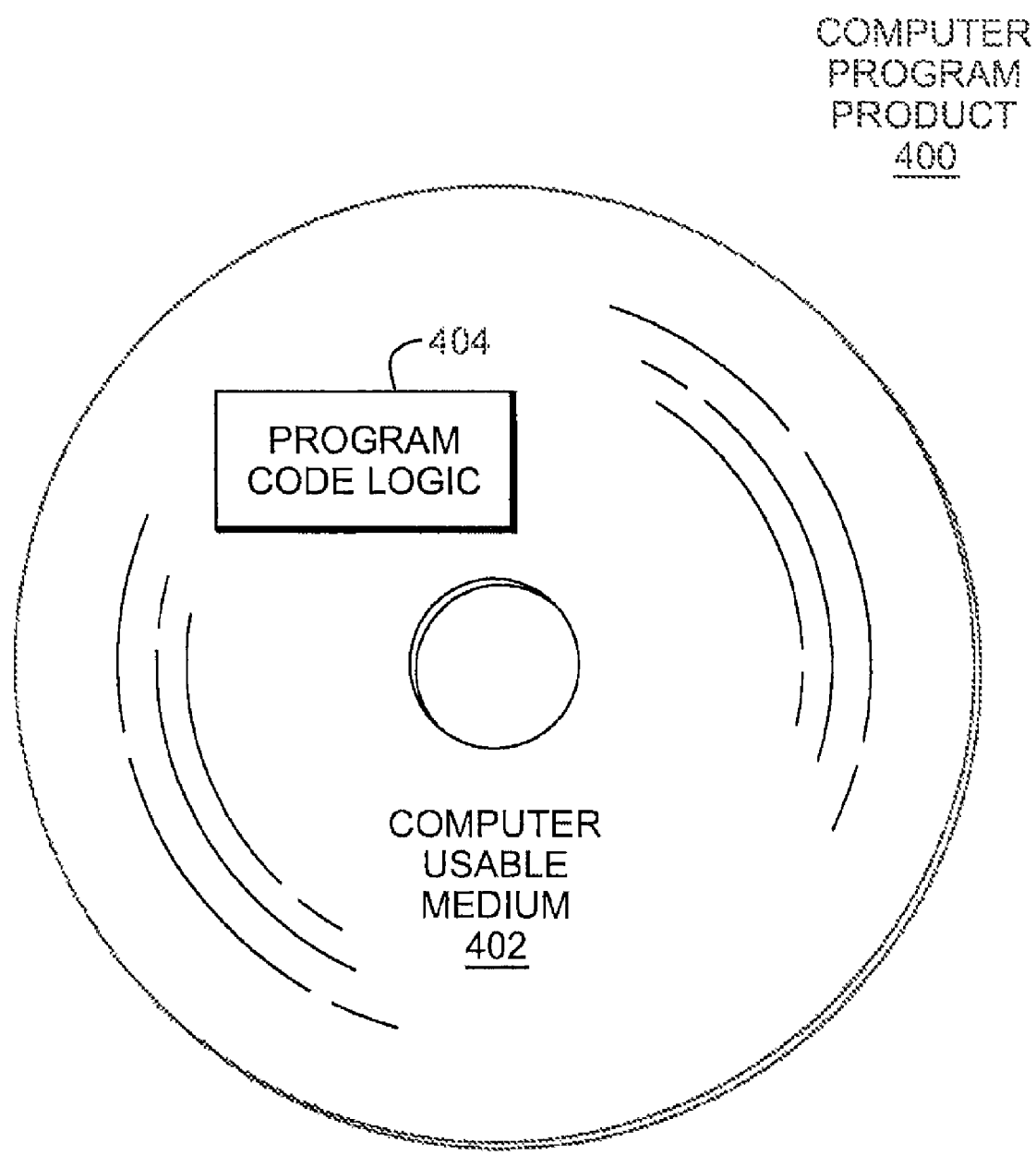
FIG. 4 depicts one embodiment of a computer program product incorporating one or more aspects of the present invention.

One example of an article of manufacture or a computer program product incorporating one or more aspects of the present invention is described with reference to FIG. 4. A computer program product 400 includes, for instance, one or more computer usable media 402 to store computer readable program code means or logic 404 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, an interrupt capability is provided that eliminates wasteful polling to determine if replies exist on a queue. This facilitates processing by increasing throughput.

Although various types of embodiments are described above, these are only examples. Other types of computing environments can benefit from one or more aspects of the present invention. As an example, an environment may include an emulator (e.g., software or other emulation mechanisms), in which a particular architecture (including, for instance, instruction execution, architected functions, such as address translation, and architected facilities, such as architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating processing of queues of a processing environment, the computer program product comprising:
   a storage medium readable by a processing circuit and storing instructions for execution by the processing circuit for performing a method comprising;
   determining that a queue of the processing environment has transitioned from a no replies pending state to a reply pending state, wherein the queue is indirectly accessible to user programs, and wherein the no replies pending state is a state in which the queue is empty, and the reply pending state is a state in which the queue is not empty;
   enabling the queue for interruption, the enabling comprising employing a process adjunct processor queue (PQAP) instruction to enable the queue for interruption, wherein the PQAP instruction employs general registers 0, 1 and 2 for input, and general register 1 for output; and
   initiating, by a processor, an interrupt for the queue, wherein the initiating is based on enabling the queue and determining that the queue has transitioned from the no replies pending state to the reply pending state, wherein the interrupt is initiated based on the queue transitioning from an empty state to a non-empty state, and the interrupt is not initiated based on the queue not transitioning from the empty state to the non-empty state.

2. The computer program product of claim 1, wherein, for input, general register 0 includes a function code indicating an interruption control and a queue number designating the queue to be processed, general register 1 includes an interruption request indicator specifying enablement or disablement of the queue, and general register 2 includes an address of a notification indicator.

3. The computer program product of claim 2, wherein, for input, general register 1 further includes an indication of an interruption subclass.

4. The computer program product of claim 1, wherein, for output, general register 1 includes a status indicator providing status relating to execution of the PQAP instruction.

5. The computer program product of claim 1, wherein the method further comprises placing a reply to a request on the queue when the queue is in the no replies pending state, transitioning the queue from the no replies pending state to the reply pending state.

6. The computer program product of claim 1, wherein the queue is an adjunct processor queue, and wherein the initiating is performed by an adjunct processor.

7. The computer program product of claim 6, wherein the adjunct processor queue is located in system memory coupled to the adjunct processor and to a central processor of the processing environment.

8. A computer system for facilitating processing of queues of a processing environment, said computer system comprising:
   a memory; and
   a processor in communications with the memory, wherein the computer system is configured to perform a method, said method comprising:
      determining that a queue of the processing environment has transitioned from a no replies pending state to a reply pending state, wherein the queue is indirectly accessible to user programs, and wherein the no replies pending state is a state in which the queue is empty, and the reply pending state is a state in which the queue is not empty; and
      enabling the queue for interruption, the enabling comprising employing a process adjunct processor queue (PQAP) instruction to enable the queue for interruption, wherein the PQAP instruction employs general registers 0, 1 and 2 for input, and general register 1 for output; and
      initiating, by a processor, an interrupt for the queue, wherein the initiating is based on enabling the queue and determining that the queue has transitioned from the no replies pending state to the reply pending state, wherein the interrupt is initiated based on the queue transitioning from an empty state to a non-empty state, and the interrupt is not initiated based on the queue not transitioning from the empty state to the non-empty state.

9. The computer system of claim 8, wherein, for input, general register 0 includes a function code indicating an interruption control and a queue number designating the queue to be processed, general register 1 includes an interruption request indicator specifying enablement or disablement of the queue, and general register 2 includes an address of a notification indicator; and wherein, for output, general register 1 includes a status indicator providing status relating to execution of the PQAP instruction.

10. The computer system of claim 8, wherein the method further comprises placing a reply to a request on the queue when the queue is in the empty state, transitioning the queue from the empty state to the non-empty state.

11. The computer system of claim 8, wherein the queue is an adjunct processor queue.

12. A computer-implemented method of facilitating processing of queues of a processing environment, said method comprising:
   determining that a queue of the processing environment has transitioned from a no replies pending state to a reply pending state, wherein the queue is indirectly accessible to user programs, and wherein the no replies pending state is a state in which the queue is empty, and the reply pending state is a state in which the queue is not empty;
   enabling the queue for interruption, the enabling comprising employing a process adjunct processor queue (PQAP) instruction to enable the queue for interruption, wherein the PQAP instruction employs general registers 0, 1 and 2 for input, and general register 1 for output; and
   initiating, by a processor, an interrupt for the queue, wherein the initiating is based on enabling the queue and determining that the queue has transitioned from the no replies pending state to the reply pending state, wherein the interrupt is initiated based on the queue transitioning from an empty state to a non-empty state, and the interrupt is not initiated based on the queue not transitioning from the empty state to the non-empty state.

13. The computer-implemented method of claim 12, wherein, for input, general register 0 includes a function code indicating an interruption control and a queue number designating the queue to be processed, general register 1 includes an interruption request indicator specifying enablement or disablement of the queue, and general register 2 includes an address of a notification indicator, and wherein, for output, general register 1 includes a status indicator providing status relating to execution of the PQAP instruction.

* * * * *